US012260741B2

(12) United States Patent
Gazal et al.

(10) Patent No.: US 12,260,741 B2
(45) **Date of Patent: *Mar. 25, 2025**

(54) SECURITY DEVICE

(71) Applicant: Essence Security International (E.S.I.) Ltd, Herzeliya Pituach (IL)

(72) Inventors: Elly Gazal, Tel Mond (IL); Eran Cohen, Tel-Aviv (IL); Gad Noor, Givatayim (IL); Micha Weissberg, Rishon-LeZion (IL)

(73) Assignee: Essence Security International (E.S.I.) Ltd, Herzeliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/790,496

(22) PCT Filed: Dec. 24, 2020

(86) PCT No.: PCT/IL2020/051332

§ 371 (c)(1),
(2) Date: Jun. 30, 2022

(87) PCT Pub. No.: WO2021/137214

PCT Pub. Date: Jul. 8, 2021

(65) Prior Publication Data

US 2023/0041973 A1 Feb. 9, 2023

(30) Foreign Application Priority Data

Dec. 31, 2019 (GB) ..................................... 1919457

(51) Int. Cl.
*G08B 29/18* (2006.01)
*G08B 13/196* (2006.01)

(52) U.S. Cl.
CPC ..... *G08B 29/181* (2013.01); *G08B 13/19619* (2013.01)

(58) Field of Classification Search
CPC ........... G08B 29/181; G08B 13/19619; G08B 17/113; H04R 2225/31; F21V 21/30
See application file for complete search history.

(56) References Cited

U.S. PATENT DOCUMENTS 5,122,927 A 6/1992 Satou
5,280,273 A 1/1994 Goldstein
(Continued)

FOREIGN PATENT DOCUMENTS

DE 102005049469 A1 4/2007
DE 102010027944 A1 10/2011
(Continued)

OTHER PUBLICATIONS

Foreign Communication from a Related Counterpart Application, International Search Report and Written Opinion dated Mar. 31, 2021, International Application No. PCT/I L2020/051332 filed on Dec. 24, 2020.

(Continued)

*Primary Examiner* — Mirza F Alam
(74) *Attorney, Agent, or Firm* — Conley Rose P.C.

(57) ABSTRACT

A security device is disclosed comprising a main housing, a power supply housing releasable from the main housing and a release arrangement configured to provide a release process in which the power supply housing is moveable from an installed configuration to a released configuration via a partially released configuration. A power connection is provided for supply of power to the security device when the power supply housing is in the partially released configuration. Processing circuitry is configured to obtain power via the power connection and receive an indication that the power supply housing has moved from the installed configuration and/or to the partially released configuration.

20 Claims, 8 Drawing Sheets

(56) References Cited

U.S. PATENT DOCUMENTS

| | | | | |
|---|---|---|---|---|
| 8,586,225 | B1 | 11/2013 | Bausch et al. | |
| 2006/0152376 | A1* | 7/2006 | Demster | G08B 29/181 340/636.1 |
| 2012/0098655 | A1* | 4/2012 | Preta | F21S 9/022 307/66 |
| 2015/0022357 | A1* | 1/2015 | Gettings | G01J 1/0437 340/568.1 |
| 2015/0350797 | A1* | 12/2015 | Müller | H04R 25/602 381/323 |
| 2016/0338212 | A1* | 11/2016 | Schmidt | G08B 17/113 |

FOREIGN PATENT DOCUMENTS

| | | | |
|---|---|---|---|
| EP | 2381505 | A1 | 10/2011 |
| GB | 2312312 | A | 10/1997 |
| WO | 9604626 | A1 | 2/1996 |
| WO | 2021137214 | A1 | 7/2021 |

OTHER PUBLICATIONS

Foreign Communication from a Related Counterpart Application, Combined Search Report and Examination Report dated Jun. 23, 2020, United Kingdom Application No. GB1919457.0 filed on Dec. 24, 2020.

Foreign Communication from a Related Counterpart Application, International Preliminary Report on Patentability dated Jul. 5, 2022, International Application No. PCT/IL2020/051332 filed on Dec. 24, 2020.

* cited by examiner

SECURITY DEVICE

CROSS-REFERENCE TO RELATED APPLICATIONS

The present application is a filing under 35 U.S.C. 371 as the National Stage of International Application No. PCT/IL2020/051332, filed Dec. 24, 2020, entitled "Security Device," which claims priority to United Kingdom Application No. 1919457.0 filed with the Intellectual Property Office of the United Kingdom on Dec. 31, 2019, both of which are incorporated herein by reference in their entirety for all purposes.

TECHNICAL FIELD

The present invention relates to a security device and method of removing a power supply housing from a security device. In some embodiments, the invention more specifically relates to security devices having a camera and/or a motion detector.

BACKGROUND

It is known that security devices can include a means to wirelessly send an alert or notification when a first component, housing one or more batteries, is removed from a second component, housing a processor for operating the security device.

For example, capacitors on the second component can be used to store enough charge should the first component be removed to maintain operation of the processor and a transmitter for long enough for the removal of the first component to be detected and for the transmitter to transmit a notification that the first component has been removed.

However, such capacitors have a leakage current that consumes power and it is difficult to control a time constant for discharge of the capacitors. In addition, the inclusion of capacitors for such a purpose results in a high inrush current when the device is powered up, and the inrush current may reduce a lifespan and/or performance characteristics of the capacitors.

Also, some such security devices are installed using a mounting against a wall, which can be at about two meters above floor level, and it is advantageous to be able to remove the battery holding component without having to remove the whole device from the wall. The actuation of a release mechanism for the battery holding component can result in the battery holding component falling on a service person or falling to the floor if the service person is not able to sustain a steady grip on the battery holding component during its removal.

It is therefore an aim of embodiments of the invention to at least ameliorate one or more of the above or other shortcomings of the prior art and/or to provide a useful alternative.

SUMMARY

In general, some embodiments of the invention provide a security device with a prolonged process for removal of a power supply housing from a main housing. This enables power to continue to be supplied to a processor in the main housing during at least a first stage of removal, which, in turn, allows an alert to be transmitted from the security device to a control panel.

In a first aspect of the present invention, there is provided a security device comprising:

a main housing; and a power supply housing for holding at least one power cell for supplying power to the security device, wherein the power supply housing is releasable from the main housing; and a release arrangement configured to provide a release process in which the power supply housing is moveable from an installed configuration to a released configuration via a partially released configuration;

wherein a power connection is provided for supply of power to the security device when the power supply housing is in the partially released configuration; and further comprising processing circuitry configured to:

obtain power via the power connection; and receive an indication that the power supply housing has moved from the installed configuration and/or to the partially released configuration.

Thus, certain embodiments of the invention provide a security device capable of maintaining power during at least an initial stage of removal, thereby allowing the detection of the removal of the power supply housing. Advantageously, such embodiments of the invention do not require the use of capacitors for prolonging processing circuitry operation after power supply removal, which, as mentioned above, may result in unfavourable power consumption and/or may have unpredictable operating characteristics.

It will be understood that authorised removal of the power supply housing may be required for routine replacement of the at least one power cell (e.g. battery). However, an aim of some embodiments of the invention is to detect unauthorised removal of the power supply housing, for example, by a burglar. For example, a control panel may determine whether the removal of the power supply housing was authorised or not.

In both cases, an electrical connectivity is provided between the power supply housing and the main housing to provide power to the processing circuitry in both a fully inserted configuration and in a semi-inserted configuration. Furthermore, the power supply housing has a removal path from the fully inserted configuration to disconnect the power supply housing from the main housing and, in the removal path, the power supply housing transitions into the semi-inserted configuration.

In some embodiments, the partially released configuration (which may also be described as the semi-inserted configuration) may be defined as comprising any number of positions between the installed (i.e. fully inserted) configuration and the released (i.e. fully removed) configuration. In some embodiments, there may be a continuum of positions in the partially released configuration and/or there may be one or more defined positions in the partially released configuration.

In some embodiments, the release process may comprise a single stage (e.g. requiring only a single user action) to permit the power supply housing to be moved from the installed configuration to the released configuration. In which case, the partially released configuration may not be at a defined position but may be any position during a transition phase from the installed configuration to the released configuration. The transition phase may be configured to last a pre-defined minimum duration to allow adequate time to receive the indication that the power supply housing has moved from the installed configuration and/or to the partially released configuration.

In some embodiments, the release process (i.e. transition phase) may be lengthy due to friction between the power supply housing and the main housing.

In some embodiments, the release process may be lengthy due to provision of a complex extraction path for removal of the power supply housing.

Thus, the release process may require a service person to pull, twist, angle or otherwise manipulate the power supply housing in order to release it from the main housing, and in some embodiments a combination of such or other actions may be required for release.

The release process may comprise a first step in which the power supply housing is moveable from the installed configuration to a position within the partially released configuration and a second step in which the power supply housing is moveable from said position to the released configuration.

Such a two-stage release process may serve to make the removal of the power supply housing more difficult, whilst maintaining power to the processing circuitry. Thus, an advantage of having a second stage of release is that further interaction with the service person is required and this takes time, which allows power to be maintained for a longer period than otherwise.

The release arrangement may comprise a stop, which defines the position of the power supply housing at an end of the first step.

The processing circuitry may be further configured to: on receipt of said indication, instruct a transmitter to transmit a notification to another device, the notification indicating that the power supply housing is being removed. The notification may comprise an alert.

The transmitter may be provided in the security device and may be configured for wireless transmission.

The security device may further comprise an electrical circuit configured to send the indication to the processing circuitry when at least one of: the power supply housing is moved from the installed position; or the power supply housing is moved into the partially released configuration.

The security device may comprise a switch for providing said indication, wherein the switch has at least one switch contact on the main housing.

The said indication may be based on the at least one switch contact changing a connection state with a power supply on the power supply housing.

In some embodiments, two switch contacts may be provided on the main housing and a connection between the two switch contacts may be made or broken by an insulator, on the power supply housing, that is configured to come between the two switch contacts.

The power connection may be arranged to provide continuous supply of power to the security device when the power supply housing is in the installed configuration and during transit of the power supply housing to and/or in the partially released configuration.

The power connection may comprise a railing on at least one of the power supply housing and the main housing and a corresponding contact for the railing on at least the other of the power supply housing and the main housing.

The railing may comprise a first conductive strip for a first terminal polarity configured for connection with a first power contact and a second conductive strip for a second terminal polarity configured for connection with a second power contact.

The first conductive strip and the second conductive strip may be on a same one of the power supply housing and the main housing.

Upon an initiation of the first step, the power supply housing may be configured to fall from the installed configuration to the partially released configuration by force of gravity.

The power supply housing may be linearly moveable from the installed configuration to the partially released configuration.

The power supply housing may be moveable from the installed configuration to the partially released configuration along a first removal direction and may be prevented from continuation along the first removal direction by an interference.

The interference may be configured for disengagement, by an intervention from a person removing the power supply housing, in order to permit release of the power supply housing.

In the partially released configuration, the power supply housing and the main housing may be coupled by first and second inter-engaging parts.

The first and second inter-engaging parts may comprise at least one guide and at least one stop.

The security device may comprise a first actuator operable to initiate the first stage of release.

The first actuator may be operable by pulling, rotating, twisting, angling, pressing, sliding, squeezing or the like.

In a particular embodiment, the first actuator may be operable by pulling in a direction that has at least a component that is parallel with a direction of movement of the power supply housing from the installed configuration.

The security device may comprise a second actuator operable to initiate the second stage of release.

The second actuator may be operable without a tool, for example, by operator manipulation.

The release arrangement may be configured so that the second actuator is inaccessible when the power supply housing is in the installed configuration and is accessible when the power supply housing is in the partially released configuration.

The release arrangement may be disposed at or towards an end of the security device.

The security device may comprise a mounting arrangement for mounting the security device to a support surface at an elevated position above ground, the mounting arrangement configured so that when the security device is mounted to the support surface the release arrangement is oriented towards the ground.

The mounting arrangement may be disposed at or towards an opposite end of the security device to the release arrangement.

The security device may comprise a guide arrangement configured to facilitate removal of the power supply housing from the main housing.

The security device may comprise at least one sensor arrangement that has a field of view for sensing electromagnetic waves from an environment.

The field of view of the at least one sensor arrangement may be directed more towards one end of the security device than another opposite end of the security device and wherein the release arrangement may be provided at or towards said one end.

The at least one sensor arrangement may comprise one or more of: a radar sensor arrangement, a sonar sensor arrangement and a lidar sensor arrangement.

The at least one sensor arrangement may comprise at least one of:

a sensor arrangement for a motion detector; and a sensor arrangement for a camera.

The motion detector may comprise a passive infrared (PIR) sensor and a lens. The PIR sensor and the lens may be mounted in proximity to the release arrangement.

The camera may be located toward an opposite end of the device to the release arrangement.

The at least one power cell may be at least one battery.

In a second aspect of the present invention, there is provided a method of detecting removal of a power supply housing from the security device of any preceding claim, the method comprising:

receiving an indication that the power supply housing has moved from the installed configuration and/or to the partially released configuration; and on receipt of said indication, instructing a transmitter to transmit a notification to another device, the notification indicating that the power supply housing is being removed.

In a third aspect of the present invention, there is provided a non-transitory computer readable medium comprising instructions operable by a processor to carry out the method of the second aspect of the invention.

In a fourth aspect of the present invention, there is provided a security device comprising:

a main housing; and a power supply housing for holding at least one power cell for supplying power to the security device, wherein the power supply housing is releasable from the main housing; and a release arrangement configured to provide a two-step release process;

wherein, in a first step of release, the power supply housing is moveable from an installed configuration to a partially released configuration, from which a second step of release is required.

Thus, embodiments of the fourth aspect of the invention provide a security device having a two-stage release mechanism to make it more difficult to remove the power supply housing. During a first stage of release, the power supply housing can be moved, or may fall under its own weight, from an installed position, wherein its fall may be stopped at a second position necessitating a second stage of release.

The two-stage release mechanism may be performed whilst the security device is installed against a wall. In some embodiments, the power supply housing is movable by force of gravity to fall from an installed position upon actuation of a first release mechanism, wherein the power supply housing is guided along a defined direction by the main housing. The defined direction may have a vertical component. The main housing may include a member that engages with the power supply housing to stop the falling of the power supply housing before the power supply housing is freed from the main housing. Thus, in some embodiments the security device may comprise a freefall catch mechanism to prevent the power supply housing from falling completely out of main housing during its release.

It will be understood that the installed configuration and the partially released configuration of the power supply housing define the position of the power supply housing relative to the main housing.

Upon an initiation of the first step, the power supply housing may be configured to fall from the installed configuration to the partially released configuration by force of gravity. The power supply housing may be linearly moveable from the installed configuration to the partially released configuration.

The power supply housing may be moveable from the installed configuration to the partially released configuration along a first removal direction and may be prevented from continuation along the first removal direction by an interference.

The interference may be configured for disengagement, by an intervention from a person removing the power supply housing, in order to permit release of the power supply housing. In the partially released configuration, the power supply housing and the main housing may be coupled by first and second inter-engaging parts.

The first and second inter-engaging parts may comprise at least one guide and at least one stop.

The security device may comprise a first actuator operable to initiate the first stage of release.

The first actuator may be operable by pulling, rotating, twisting, angling, pressing, sliding, squeezing or the like.

In a particular embodiment, the first actuator may be operable by pulling in a direction that has at least a component that is parallel with a direction of movement of the power supply housing from the installed configuration.

In some embodiments, pulling of the first actuator also pulls the power supply housing out of the installed configuration.

The first actuator may be centrally located at a bottom of the device.

The security device may comprise a second actuator operable to initiate the second stage of release.

The second actuator may be operable without a tool, for example, by operator manipulation.

In some embodiments, the second actuator comprises a push button configured to pivot a catch for disengagement with the main housing.

The fact that an operator squeezes the power supply housing to initiate the second stage of release in some embodiments may make it more likely that the operator has a grip on the power supply housing so they are less likely to drop it. This contrasts with the first actuator, which may not require a gripping action of the power supply housing. Thus, release from the installed configuration may be very simple.

The release arrangement may be configured so that the second actuator is inaccessible when the power supply housing is in the installed configuration and is accessible when the power supply housing is in the partially released configuration.

The release arrangement may be disposed at or towards an end of the security device.

The security device may comprise a mounting arrangement for mounting the security device to a support surface at an elevated position above ground, the mounting arrangement configured so that when the security device is mounted to the support surface the release arrangement is oriented towards the ground.

The mounting arrangement may be disposed at or towards an opposite end of the security device to the release arrangement.

An advantage of embodiments wherein the second actuator is at or towards a lower end of the device (e.g. when mounted on a wall) is that it can require an operator to securely grip the power supply housing in order to remove it entirely from the main housing. This helps to ensure the operator has a good grip on the power supply housing when it is finally released from the main housing, thereby ensuring that the power supply housing does not fall to the floor.

The security device may comprise a guide arrangement configured to facilitate removal of the power supply housing from the main housing.

The security device may comprise at least one sensor arrangement that has a field of view for sensing electromagnetic waves from an environment.

The field of view of the at least one sensor arrangement may be directed more towards one end of the security device than another opposite end of the security device and wherein the release arrangement may be provided at or towards said one end.

The at least one sensor arrangement may comprise one or more of: a radar sensor arrangement, a sonar sensor arrangement and a lidar sensor arrangement.

The at least one sensor arrangement may comprise at least one of:

a sensor arrangement for a motion detector; and a sensor arrangement for a camera.

In some embodiments the camera captures one or more images in response to motion detected by the motion detector The motion detector may comprise a PIR sensor and a lens. The PIR sensor and lens may be mounted in proximity to the release arrangement.

The camera may be located toward an opposite end of the device to the release arrangement.

The at least one power cell may be at least one battery.

In a fifth aspect of the present invention, there is provided a method of removing a power supply housing from a security device comprising:

- disengaging a first retaining mechanism to enable a first stage of release in which the power supply housing is movable from an installed position to a partially released position; and
- disengaging a second retaining mechanism to enable a second stage of release in which the power supply housing is movable from the partially released position to a fully released position.

In the first stage of release, the power supply housing may fall from the installed position to the partially released position by force of gravity.

In the method of the fifth aspect, the security device may be as defined in the first or fourth aspects.

As used herein, except where the context requires otherwise, the terms “comprises”, “includes”, “has”, and grammatical variants of these terms, are not intended to be exhaustive. They are intended to allow for the possibility of further additives, components, integers or steps.

Features in one aspect may be applied as features in any other aspect, in any appropriate combination. For example, method features may be provided as device features or vice versa.

BRIEF DESCRIPTION OF THE SEVERAL VIEWS OF THE DRAWINGS

Embodiments will now be described by way of example only, and with reference to the accompanying drawings, of which.

DETAILED DESCRIPTION OF THE EMBODIMENTS

Figure 1:
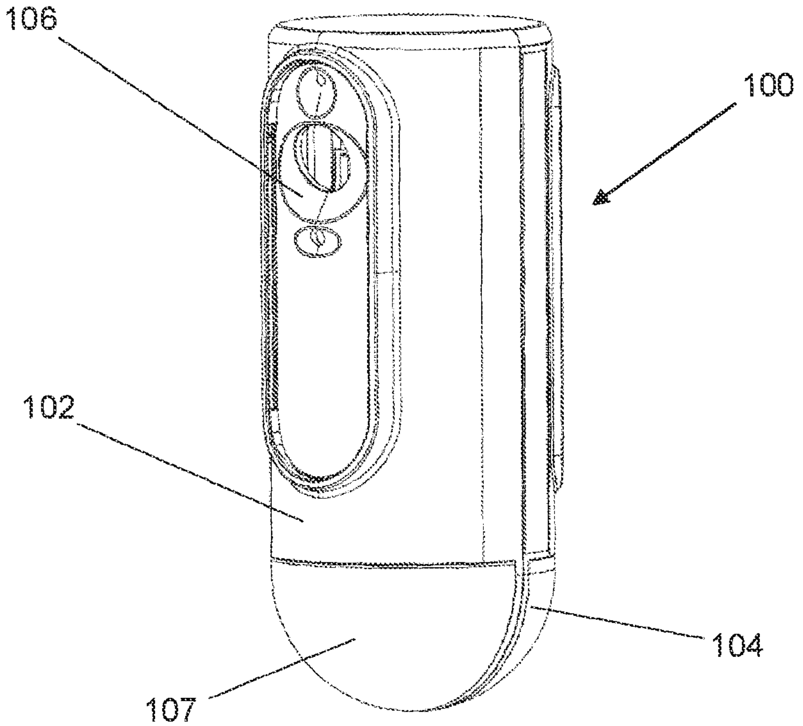
FIG. 1 is a front perspective view of a security device according to a first embodiment of the invention.
Figure 2:
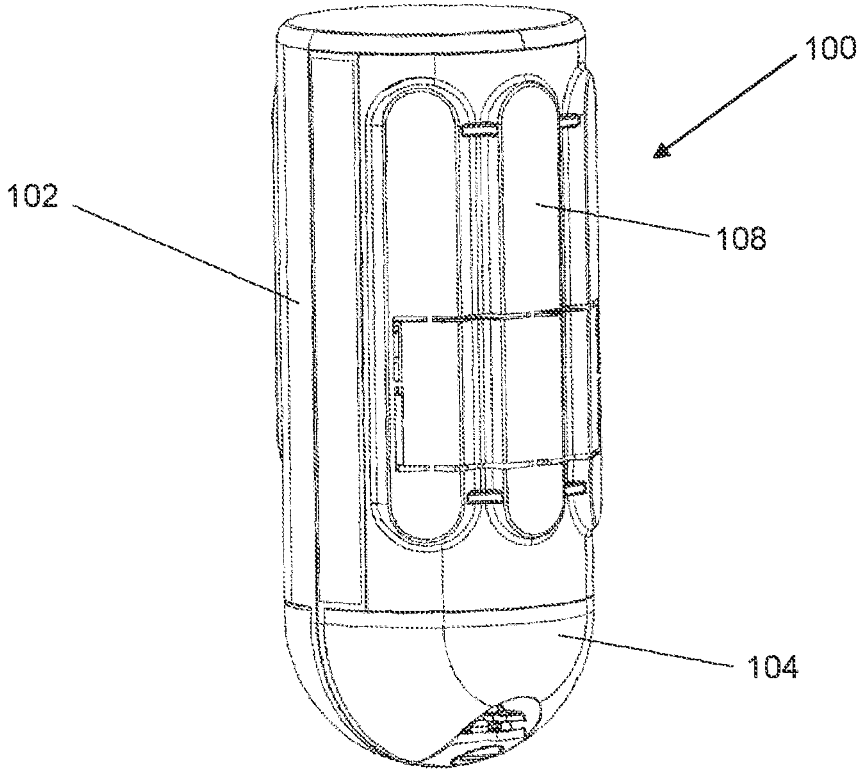
FIG. 2 is a rear perspective view of the security device of FIG. 1.

FIGS. 1 and 2 show, respectively, front and rear views of a security device 100 according to a first embodiment of the invention. The security device 100 comprises a main housing 102 and a removable power supply housing 104. The main housing 102 incorporates processing circuitry (not shown) and a sensor arrangement 106. At a rear of the main housing 102 is a mounting arrangement 108 for mounting the security device 100 to a wall or the like. The sensor arrangement 106 may comprise one or more sensors and the/each sensor may be internal to the security device 100 and may receive information via optics (e.g. one or more lenses) on the housing. An example of such a sensor is an image sensor.

Figure 3:
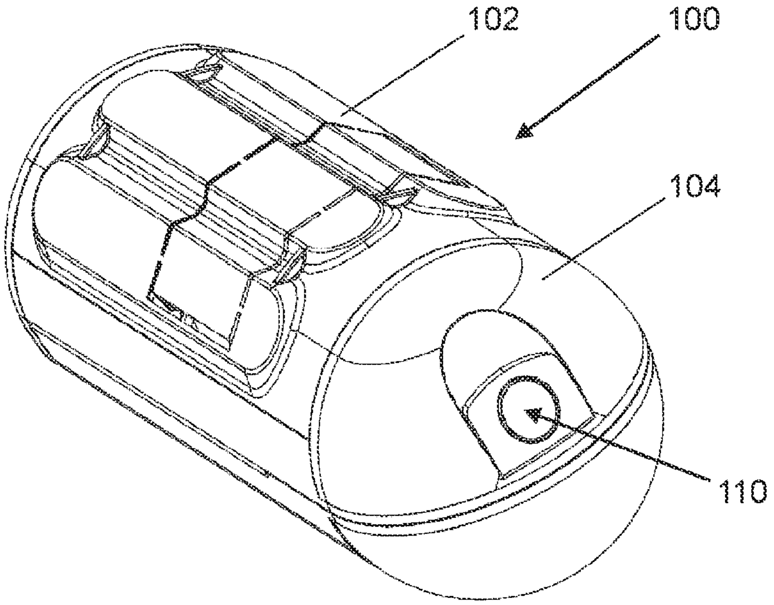
FIG. 3 is an end perspective view of the security device of FIG. 1 with a power supply housing installed.
Figure 4:
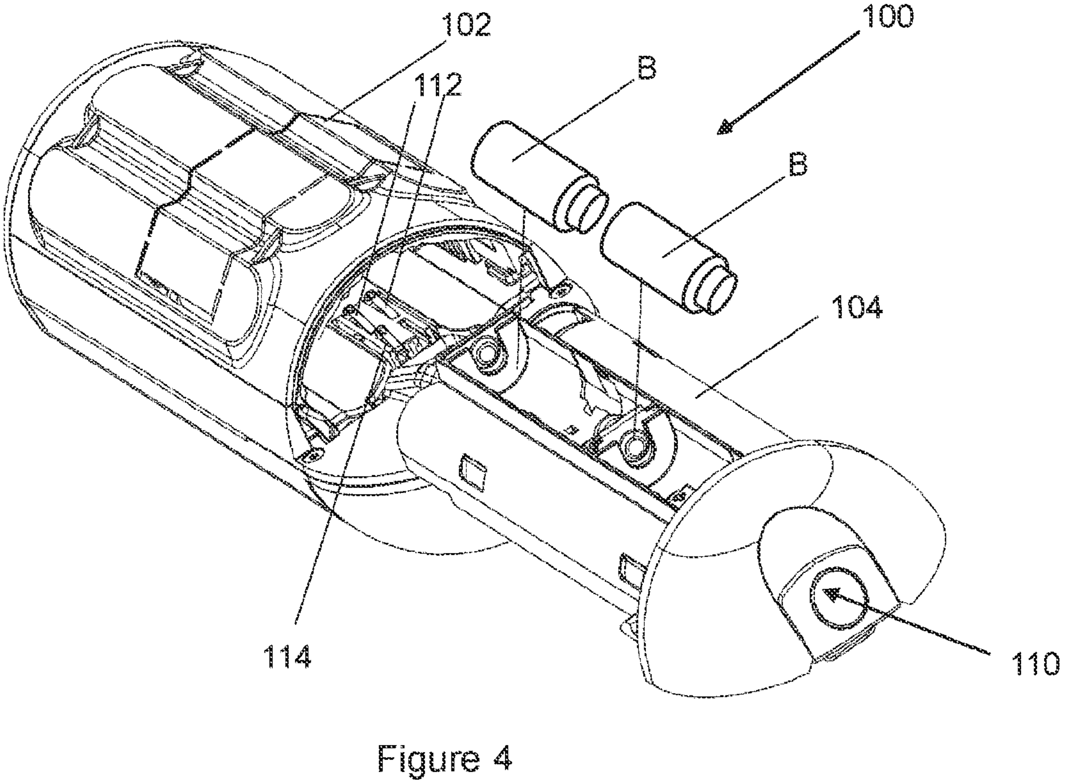
FIG. 4 is an end perspective view of the security device of FIG. 1 with the power supply housing fully extracted.
Figure 5:
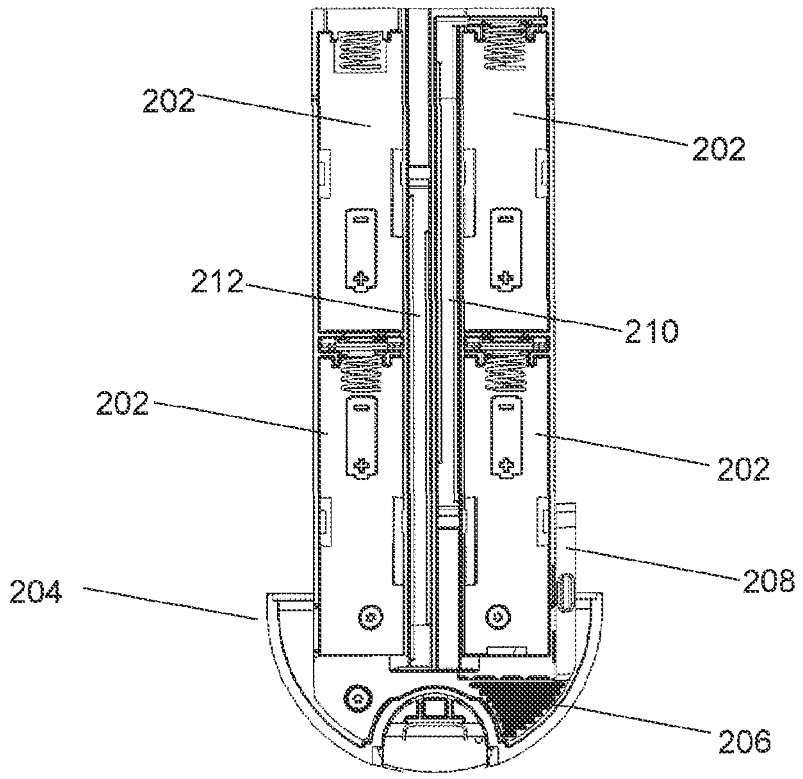
FIG. 5 shows a front view of the power supply housing when fully removed from a main housing.

In some embodiments, the sensor arrangement 106 may additionally or alternatively comprise a motion sensor (e.g. a PIR sensor) which may be provided beneath a bottom lens 107. As shown in FIG. 3, a lower end of the security device 100 has an actuator 110, which can be pulled to remove the power supply housing 104 from the main housing 102 as shown in FIG. 4. An interior of the power supply housing 104 is configured for receipt of one or more power cells. In the embodiment of FIG. 4, two batteries B may be inserted into a rear side of the power supply housing 104 for supply of power to the processing circuitry and sensor arrangement 106 in the main housing 102. A further four batteries may be inserted into a front side of the power supply housing (as shown in FIG. 5). In other embodiments, other numbers of batteries or other power cells may be employed.

Also shown in FIG. 4, are two parallel power supply contacts 112 provided within the main housing 102, for contact with railing on the power supply housing 104 in the form of conductive strips that carry respective positive and negative power supply voltages, as will be described in more detail below. The positive and negative power supply voltages may also be referred to as voltage rails or power rails. In addition, a switch contact 114 is provided within the main housing 102 to trigger a notification to the processing circuitry to indicate that the power supply housing 104 has moved from the installed configuration and/or to the partially released configuration, as will be described in more detail below.

Figure 6:
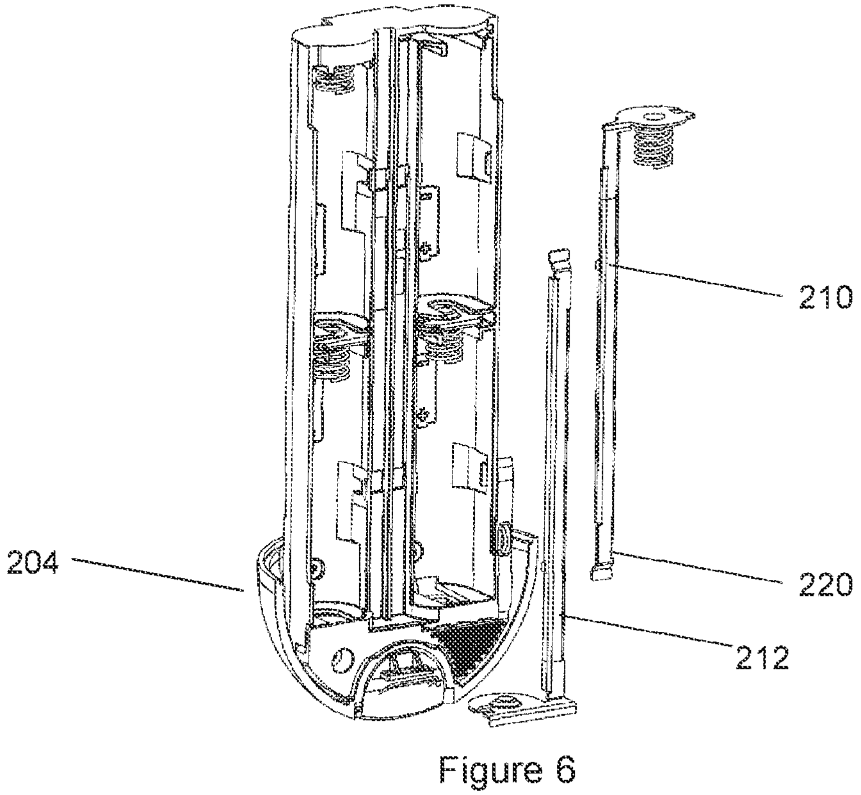
FIG. 6 shows an exploded perspective view of the power supply housing.

FIGS. 5 and 6 show the power supply housing 104 (numbered 204 in FIGS. 5 and 6) when fully removed from a main housing of a security device such as that of FIG. 1. These figures show the four front-side battery compartments 202 connected to a positive terminal conductive strip 212 and a negative terminal conductive strip 210. A push button (second) actuator 206 is provided towards a lower end of the power supply housing 204 such that it may be accessible by an operator when the power supply housing 204 is in a partially released configuration. The second actuator 206 is connected to a catch 208 that is configured to pivot around a pivot point (not shown) to release the power supply housing 204 from a corresponding catch on the main housing as will be described below.

Figure 7:
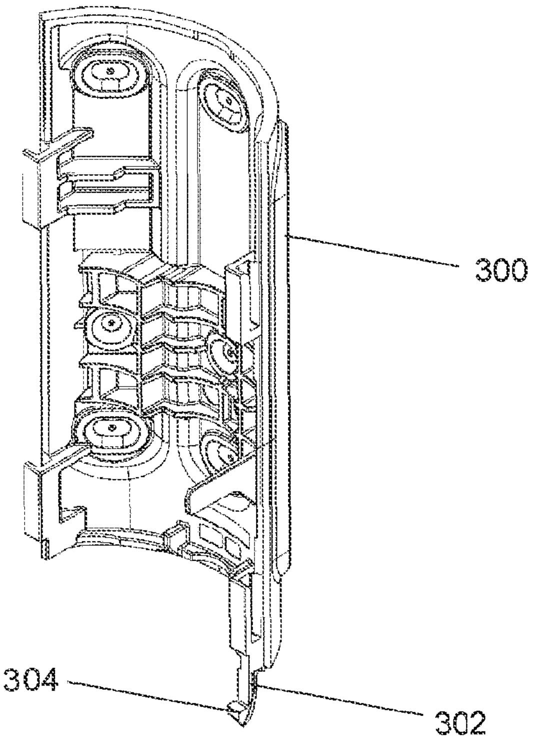
FIG. 7 shows an interior perspective view of a rear component of the main housing of the security device of FIG. 1.
Figure 8:
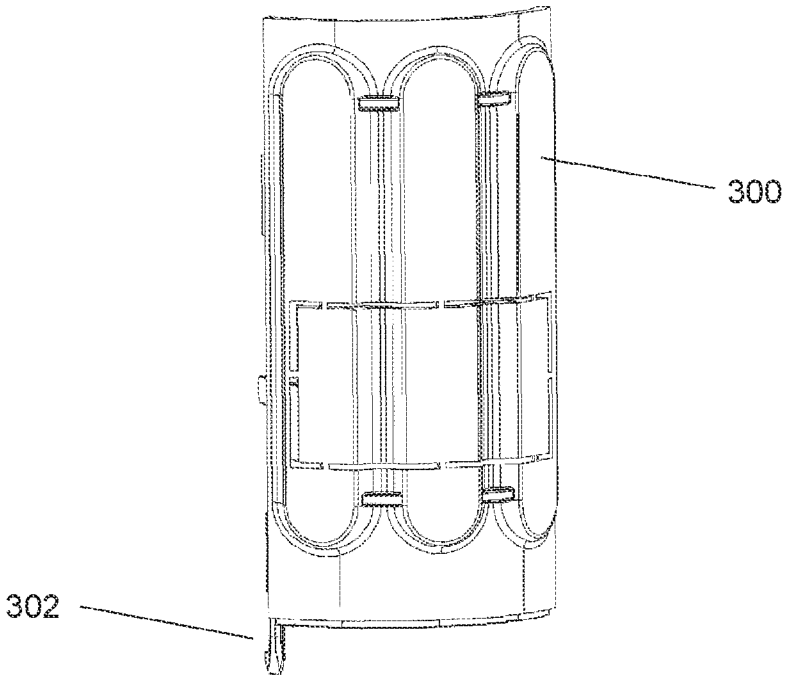
FIG. 8 shows an exterior view of the component of FIG. 7.

FIGS. 7 and 8 show, respectively, interior and exterior views of a rear component 300 of the main housing 102 of the security device 100 of FIG. 1. The rear component 300 has a depending leg 302 at one side. The depending leg 302 terminates in a projection 304 configured to catch onto a similar projection on the catch 208 on the power supply housing 204 to stop the power supply housing from falling completely out of the main housing 102 during its release. Accordingly, the projection 304 and catch 208 constitute inter-engaging parts arranged to retain the power supply housing 204 in a partially released configuration with respect to the main housing 102.

Figure 9:
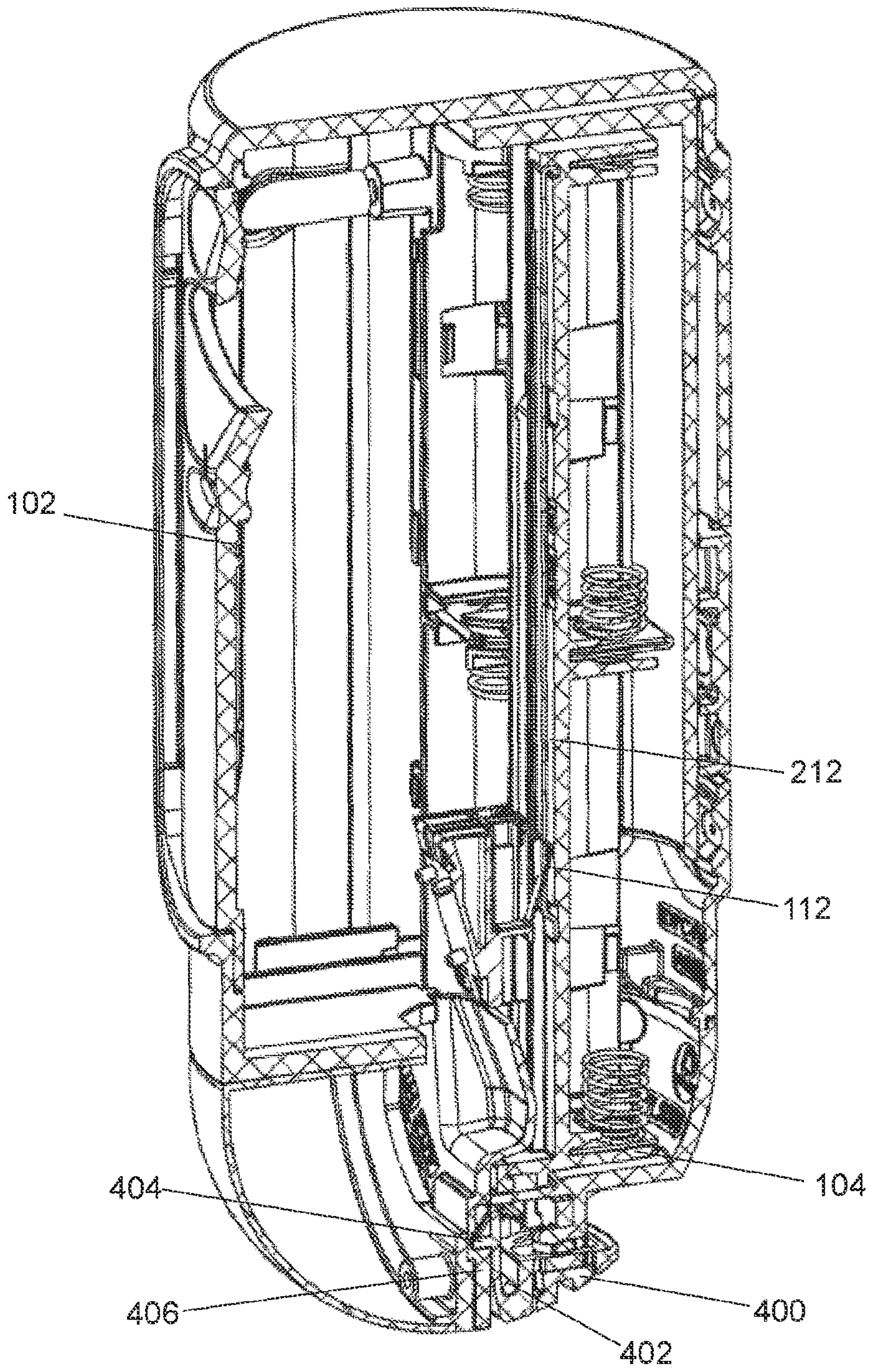
FIG. 9 shows a middle front to rear cross-sectional view of the security device of FIG. 1 with the power supply housing in the installed configuration.

FIG. 9 shows a middle front to rear cross-sectional view of the security device 100 of FIG. 1 with the power supply housing 104 in the installed configuration with respect to the main housing 102. This Figure shows one of the power supply contacts 112 in contact with the positive terminal conductive strip 212. It will be understood that the other of the power supply contacts 112 is similarly in contact with the negative terminal conductive strip 210 (not shown). Thus, with the power supply housing 104 in the installed configuration, power is supplied via the power supply contacts 112 to the processing circuitry and sensor arrangement (not shown).

FIG. 9 also shows a first actuator 400 at a bottom end of the security device 100. The first actuator 400 is in the form of a lever which when pivoted around pin 402 releases a catch 404 from a ledge 406 on the main housing 102 thereby allowing the power supply housing 104 to fall, or be pulled, from the installed configuration in the main housing 204 into a partially released configuration.

Figure 10:
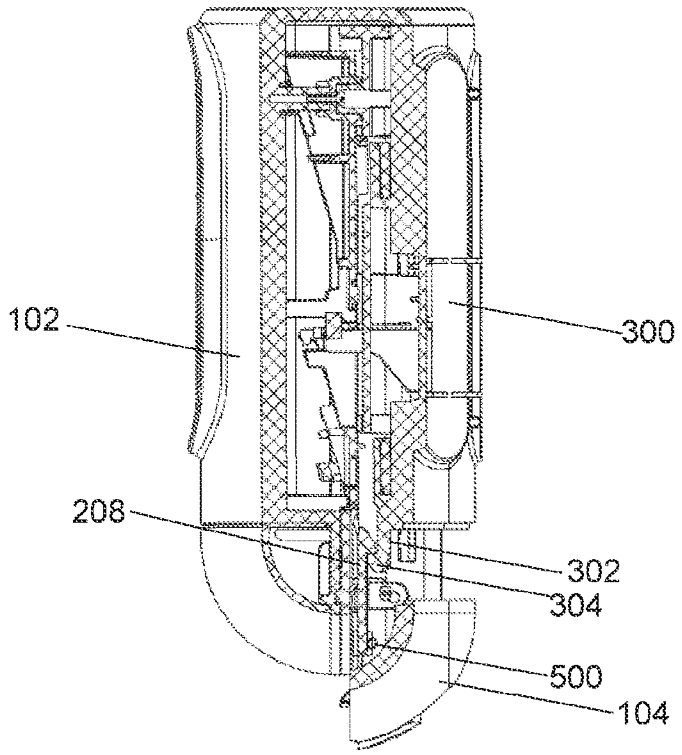
FIG. 10 shows a side front to rear cross-sectional view of the security device of FIG. 1 with the power supply housing in the partially released configuration.
Figure 11:
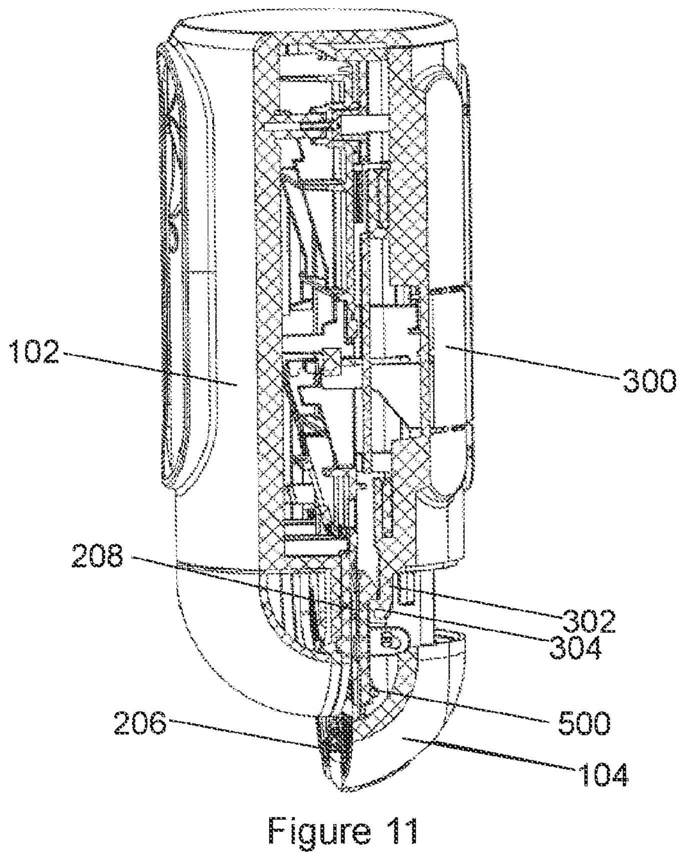
FIG. 11 shows a perspective view of the section shown FIG. 10.

FIGS. 10 and 11 show side front to rear cross-sectional views of the security device 100 of FIG. 1 with the power supply housing 102 in a partially released configuration. These Figures show the catch 208 of the power supply housing 104 being caught on the projection 304 on the depending leg 302 of the rear component 300 of the main housing 102 to stop the fall or extraction of the power supply housing 104 at the end of a first stage of release. In order to allow further release of the power supply housing 104 the second actuator 206, which is now accessible to an operator, can be pressed to cause the catch 208 to elastically bend at its base, due to a reaction force by pin 500, causing the catch 208 to pivot to release the projection on catch 208 from the projection 304 on the depending leg 302. This permits a second stage of release whereby the power supply housing 104 can be fully extracted from the main housing 102.

Notably, in some embodiments, a second stage of release may not be required. In which case, the catch 208 and projection 304 may not be provided. Instead, friction between the power supply housing 104 and the main housing 102 may serve to delay the extraction of the power supply housing 104 to permit power to be maintained, at least for long enough to allow notification that the power supply housing 104 has moved from the installed configuration and/or to the partially released configuration.

Figure 12A:
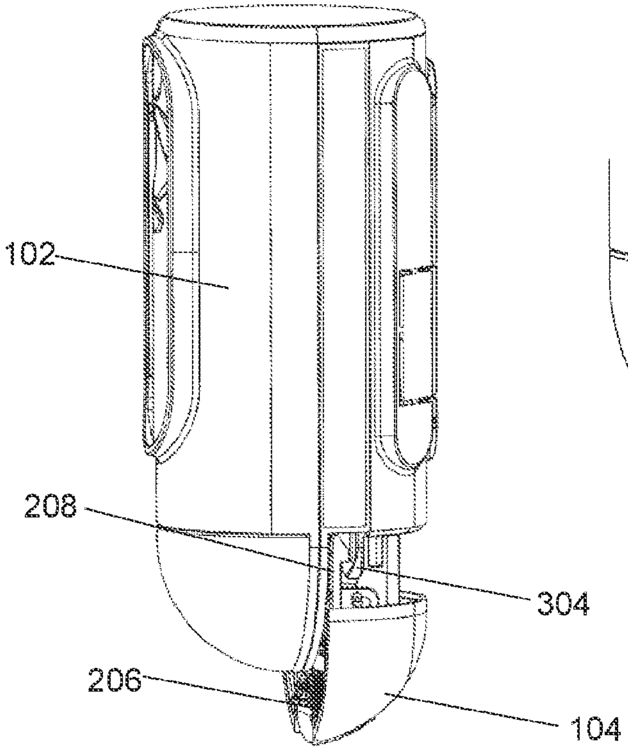
FIG. 12A shows a perspective view similar to that of FIG. 11 but showing the entire security device in the partially released configuration.
Figure 12B:
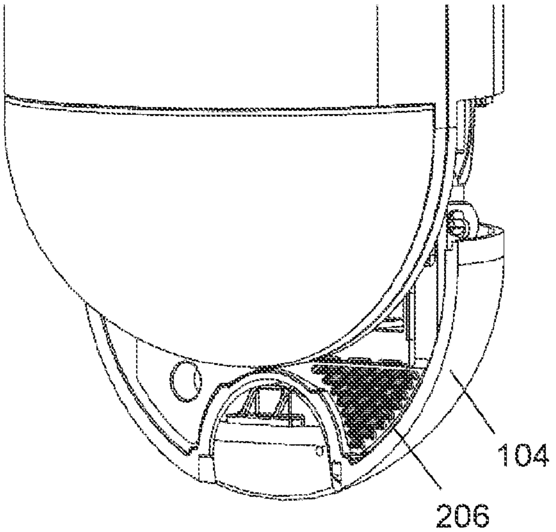
FIG. 12B shows a front perspective view of a lower portion of the security device as shown in FIG. 12A.

FIGS. 12A and 12B show views similar to that of FIG. 11 but showing an exterior of the security device 100 in the partially released configuration. Thus, the second actuator 206 is clearly visible as well as the catch 208 and the projection 304.

Figure 13:
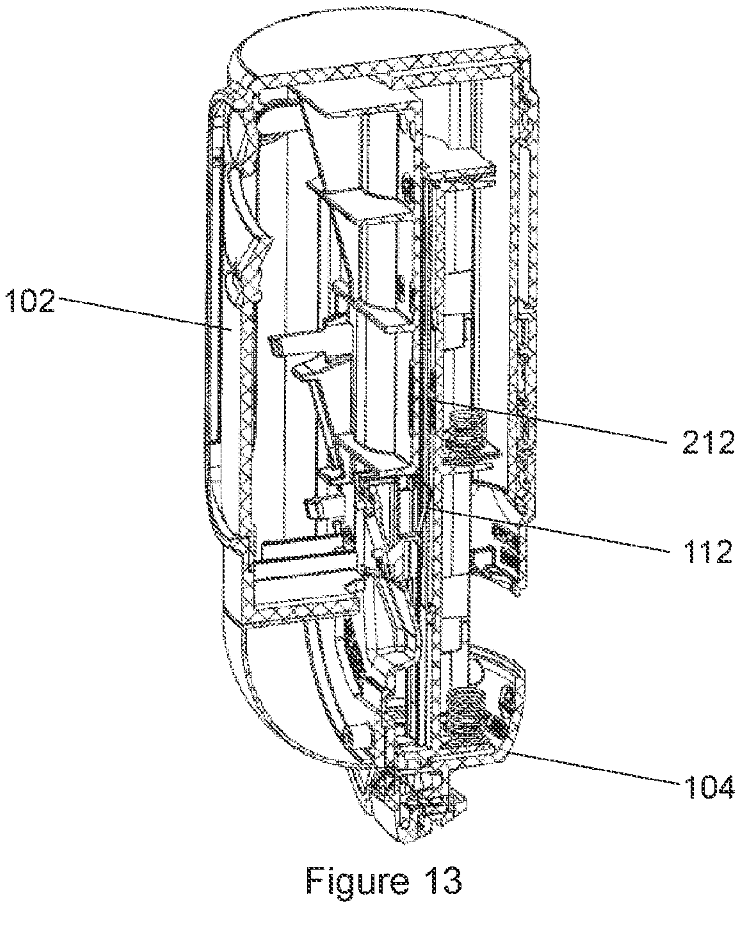
FIG. 13 shows a middle front to rear cross-sectional view of the security device of FIG. 9 with the power supply housing in the partially released configuration.

FIG. 13 shows a middle front to rear cross-sectional view of the security device 100 of FIG. 9 with the power supply housing 104 in the partially released configuration with respect to the main housing 102. This Figure shows that the power supply contact 112 is still in contact with the positive terminal conductive strip 212 in the partially released configuration. Similarly, the other power supply contact 112 is still in contact with the negative terminal conductive strip 210 (not shown). Accordingly, power is still being supplied to the processing circuitry and sensor arrangement when the power supply housing 104 is in the partially released configuration.

Figure 14:
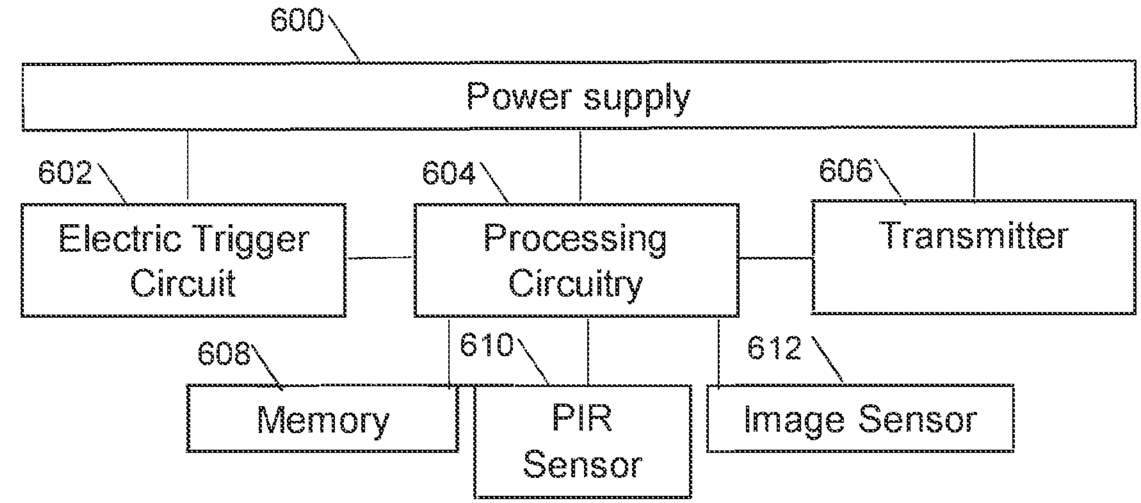
FIG. 14 is a schematic diagram showing the power supply, electric trigger circuit, processing circuitry and transmitter of the security device of FIG. 1.

FIG. 14 is a schematic diagram showing a power supply 600 connected to an electric trigger circuit 602, processing circuitry 604 and a transmitter 606 of the security device 100 of FIG. 1. Note, these electrical components are not shown in the above figures for clarity. However, it will be understood that the power supply 600 corresponds to power supplied by the batteries provided in the power supply housing 104.

During normal operation of the security device 100, the power supply housing 104 is installed in the main housing 102 and the power supply 600 is connected to the processing circuitry 604 to control operation of the security device 100. Thus, the processing circuitry 604 controls the sensor arrangement 106 to monitor an environment. In the embodiment shown in FIG. 14, the sensor arrangement 106 comprises a PIR sensor 610 and an image sensor 612. Although not shown in FIG. 14, the PIR sensor 610 and the image sensor 612 are also connected to the power supply 600. Also during normal operation, the switch contact 114, which forms part of the electric trigger circuit 602, is in contact with the conductive strip 210. However, when the first actuator 400 is actuated, the power supply housing 104 is allowed to fall downwards under the force of gravity until the catch 208 is stopped by the projection 304 to retain the power supply housing 104 in the partially released configuration. This movement of the power supply housing 104 relative to the main housing 102 causes the switch contact 114 to slide off the bottom 220 (FIG. 6) of the conductive strip 210 by the time the power supply housing 104 reaches the stopped position, and therefore break its connection with the conductive strip 210. However, at the stopped position the power supply contacts 112 on the main housing 102 are still in contact with their corresponding conductive strips 110 and 112. In other embodiments, an insulator may be provided on the power supply housing 104 such that it interrupts the connection between the switch contact 114 and a conductive strip 210 or 212 by the time the power supply housing 104 reaches the stopped position. In other embodiments, the switch contact 114 may initially be separated from a conductive strip 210 or 210 and movement of the power supply housing 104 into the partially released configuration may cause the switch contact 114 to make an electrical connection with the conductive strip. In either case, the device will be configured such that a change in state of the switch contact 114 will trigger the electrical trigger circuit 602 to send a notification to the processing circuitry 604 to indicate that the power supply housing 104 has moved from the installed configuration and/or to the partially released configuration.

On receipt of this notification, the processing circuitry 604 will instruct the transmitter 606 to send a wireless alert to a control panel to indicate that the power supply housing 104 is being removed. Optionally, an authorization check may be performed and action may then be taken at the control panel to check whether the removal of the power supply housing 104 is authorised or not.

As also shown in FIG. 14, a memory 608 is provided in communication with the processing circuitry 604. The memory 608 may comprise a non-transient computer readable medium comprising instructions operable by the processing circuitry 604 to carry out at least as a method as described below in relation to FIG. 15.

The processing circuitry 604 may comprise one or more processing chips and/or components. For example, the processing circuitry may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU).

A transceiver that includes the transmitter 606 may be distinct from the processor circuitry, but in some embodiments at least part of the processing aspects of the transceiver may have hardware in common with a processor component of the processing circuitry.

The memory 608 may be separate from the processing circuitry and/or partly or wholly integrated onto a common chip(s) with the processing circuitry. The memory may store code that, when read by the processing circuitry, causes performance of any of the methods described herein, and/or as illustrated in the drawings. For example, the memory may comprise: volatile memory, for example, one or more dynamic random access (DRAM) modules and/or static random access memory (SRAM) modules; and/or non-volatile memory, for example, one or more read only memory (ROM) modules, which for example may comprise a Flash memory and/or other electrically erasable programmable read-only memory (EEPROM) device. The code may for example be software, firmware, or hardware description language (HDL) or may be any combination of these or any other form of code for one or more processors that is known by a person skilled in the art.

Further, in other embodiments, the memory component of the device may instead or at least in part be provided by a memory device(s) that may in some embodiments be separate or removable from the device. Such devices may comprise magnetic storage devices (e.g., hard disk, floppy disk, magnetic strips), optical disks (e.g., compact disk (CD), digital versatile disk (DVD)), smart cards, and removable flash memory devices (e.g., card, stick, key drive). Further the memory components may be distributed. For example a distributed server may store code which may be downloaded to the device for execution by the processing circuitry described herein, to perform any method described herein that is executable by the processing circuitry. In some embodiments the downloaded code may be stored on local memory of the device before execution by the processing circuitry.

Figure 15:
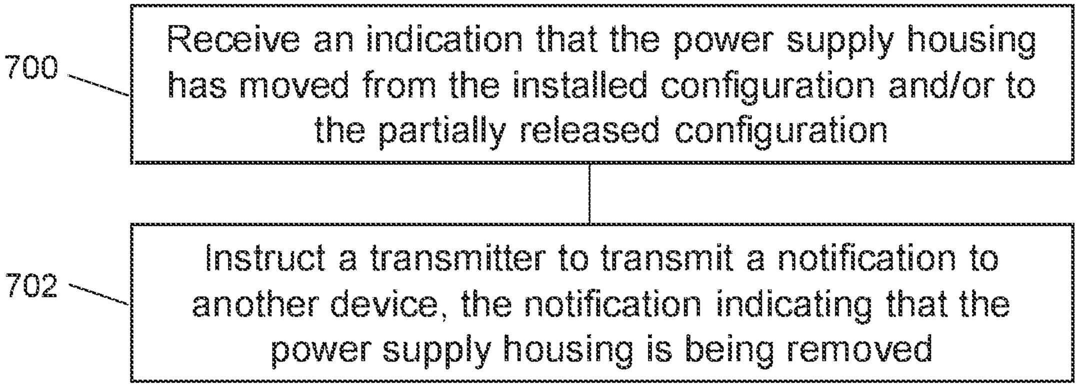
FIG. 15 illustrates a method of detecting removal of a power supply housing from the security device in accordance with embodiments of the invention.

FIG. 15 illustrates generally a method of detecting removal of a power supply housing from a security device in accordance with embodiments of the invention. Thus, there is a step 700 of receiving an indication that the power supply housing has moved from the installed configuration and/or to the partially released configuration. On receipt of said notification, there is a step 702 of instructing a transmitter to transmit a notification to another device, the notification indicating that the power supply housing is being removed. The notification may be an alert.

Figure 16:
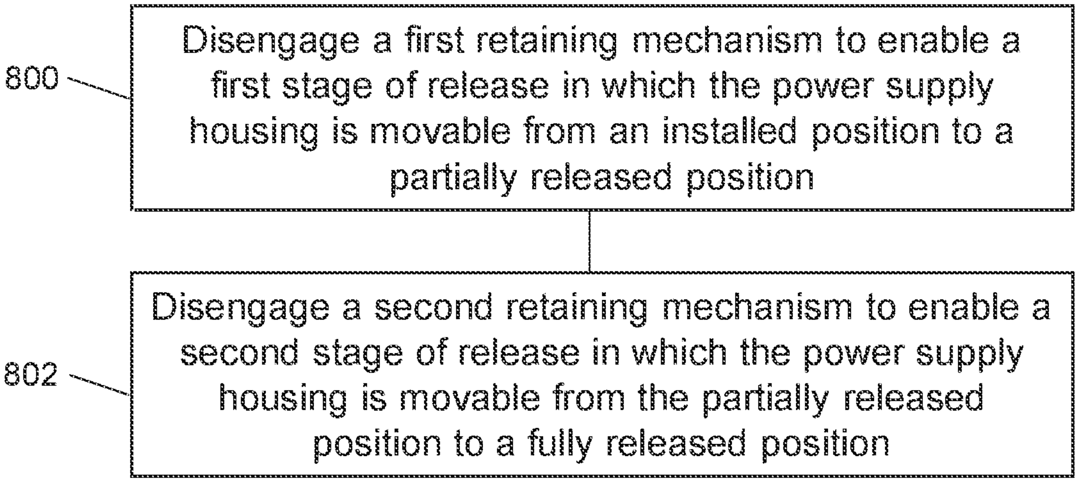
FIG. 16 illustrates a method of removing a power supply housing from a security device in accordance with embodiments of the invention.

FIG. 16 illustrates generally a method of removing a power supply housing from a security device in accordance with embodiments of the invention. Thus, there is a step 800 of disengaging a first retaining mechanism to enable a first stage of release in which the power supply housing is movable from an installed configuration to a partially released configuration. This is followed by a step 802 of disengaging a second retaining mechanism to enable a second stage of release in which the power supply housing is movable from the partially released configuration to a fully released configuration.

The first retaining mechanism may be disengaged by the first actuator described above and the second retaining mechanism may be disengaged by the second actuator described above.

It will be understood that embodiments of the invention require a lengthy extraction process in order to ensure that power is maintained for a period long enough for an alert to be transmitted to indicate that the power supply housing is being removed.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

In addition, any priority document(s) of this application is/are hereby incorporated herein by reference in its/their entirety.

What is claimed is:

1. A security device comprising:

a main housing; and a power supply housing for holding at least one power cell for supplying power to the security device, wherein the power supply housing is releasable from the main housing; and a release arrangement configured to provide a release process in which the power supply housing is moveable from an installed configuration to a released configuration via a partially released configuration;

wherein a power connection is provided for supply of power to the security device when the power supply housing is in the partially released configuration; and further comprising processing circuitry configured to:

obtain power via the power connection; and receive an indication that the power supply housing has moved from the installed configuration and/or to the partially released configuration;

wherein in the released configuration the power supply housing is fully removed from the main housing.

2. The security device of claim 1, wherein the release process comprises a first step in which the power supply housing is moveable from the installed configuration to a position within the partially released configuration and a second step in which the power supply housing is moveable from said position to the released configuration.

3. The security device of claim 2, wherein the release arrangement comprises a stop, which defines the position of the power supply housing at an end of the first step.

4. The security device of claim 1, wherein the processing circuitry is further configured to: on receipt of said indication, instruct a transmitter to transmit a notification to another device, the notification indicating that the power supply housing is being removed.

5. The security device of claim 1 further comprising an electrical circuit configured to send the indication to the processing circuitry when at least one of: the power supply housing is moved from the installed position; or the power supply housing is moved into the partially released configuration.

6. The security device of claim 5 wherein the security device comprises a switch for providing said indication, wherein the switch has at least one switch contact on the main housing; optionally, wherein the said indication is based on the at least one switch contact changing a connection state with a power supply on the power supply housing.

7. The security device of claim 1 wherein the power connection is arranged to provide continuous supply of power to the security device when the power supply housing is in the installed configuration and during transit of the power supply housing to and/or in the partially released configuration.

8. The security device of claim 7 wherein the power connection comprises a railing on at least one of the power supply housing and the main housing and a corresponding contact for the railing on at least the other of the power supply housing and the main housing.

9. The security device of claim 8 wherein the railing comprises a first conductive strip for a first terminal polarity configured for connection with a first power contact and a second conductive strip for a second terminal polarity configured for connection with a second power contact; optionally, wherein the first conductive strip and the second conductive strip are on a same one of the power supply housing and the main housing.

10. The security device of claim 2 wherein upon an initiation of the first step the power supply housing is configured to fall from the installed configuration to the partially released configuration by force of gravity.

11. The security device of claim 2 comprising a first actuator operable to initiate the first step of release and/or comprising a second actuator operable to initiate the second step of release.

12. The security device of claim 11, wherein the release arrangement is configured so that the second actuator is inaccessible when the power supply housing is in the installed configuration and is accessible when the power supply housing is in the partially released configuration.

13. The security device of claim 1, wherein the release arrangement is disposed at or towards an end of the security device.

14. The security device of claim 1, comprising at least one sensor arrangement that has a field of view for sensing electromagnetic waves from an environment.

15. The security device of claim 14, wherein the field of view of the at least one sensor arrangement is directed more towards one end of the security device than another opposite end of the security device and wherein the release arrangement is provided at or towards said one end.

16. The security device of claim 14, wherein the at least one sensor arrangement comprises at least one of:

a sensor arrangement for a motion detector; and a sensor arrangement for a camera.

17. The security device of claim 16, wherein the at least one sensor arrangement comprises one or more of: a radar sensor arrangement, a sonar sensor arrangement and a lidar sensor arrangement.

18. The security device of claim 16, comprising a passive infrared motion detector having a lens mounted in proximity to the release arrangement.

19. A method of detecting removal of a power supply housing from the security device of claim 1, the method comprising:

receiving an indication that the power supply housing has moved from the installed configuration and/or to the partially released configuration; and on receipt of said indication, instructing a transmitter to transmit a notification to another device, the notification indicating that the power supply housing is being removed.

20. A security device comprising:

a main housing; and a power supply housing for holding at least one power cell for supplying power to the security device, wherein the power supply housing is fully removable from the main housing; and a release arrangement configured to provide a two stage release process;

wherein, in a first stage of release, the power supply housing is moveable from an installed configuration to a partially released configuration, from which a second stage of release is required to fully remove the power supply housing from the main housing.

* * * * *